United States Patent
Tian et al.

(10) Patent No.: US 10,015,689 B2
(45) Date of Patent: Jul. 3, 2018

(54) CARRIER COORDINATION DEVICE AND SYSTEM, COMMUNICATIONS DEVICE AND METHOD, AND MEASUREMENT DEVICE AND METHOD

(71) Applicant: SONY CORPORATION, Tokyo (JP)

(72) Inventors: Hui Tian, Beijing (CN); Qimei Cui, Beijing (CN); Zhilin Li, Beijing (CN); Baoang Jiang, Beijing (CN); Liqi Gao, Beijing (CN); Meng Wang, Beijing (CN)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 14/890,285

(22) PCT Filed: Jun. 6, 2014

(86) PCT No.: PCT/CN2014/079319
§ 371 (c)(1),
(2) Date: Nov. 10, 2015

(87) PCT Pub. No.: WO2014/194852
PCT Pub. Date: Dec. 11, 2014

(65) Prior Publication Data
US 2016/0095007 A1   Mar. 31, 2016

(30) Foreign Application Priority Data
Jun. 8, 2013 (CN) .......................... 2013 1 0228602

(51) Int. Cl.
*H04W 24/08* (2009.01)
*H04W 72/08* (2009.01)
(Continued)

(52) U.S. Cl.
CPC ............. *H04W 24/08* (2013.01); *H04L 5/001* (2013.01); *H04L 5/0073* (2013.01);
(Continued)

(58) Field of Classification Search
CPC ....... H04W 24/08; H04L 5/001; H04L 5/0073
See application file for complete search history.

(56) References Cited

U.S. PATENT DOCUMENTS

| 2009/0081955 A1* | 3/2009 | Necker .................. H04W 16/04 455/63.1 |
| 2011/0310758 A1 | 12/2011 | Tamaki et al. |

(Continued)

FOREIGN PATENT DOCUMENTS

| CN | 101360321 A | 2/2009 |
| CN | 102149143 A | 8/2011 |
| CN | 103024753 A | 4/2013 |

OTHER PUBLICATIONS

International Search Report dated Aug. 29, 2014 for PCT/CN2014/079319 filed on Jun. 6, 2014.

*Primary Examiner* — Siming Liu
(74) *Attorney, Agent, or Firm* — Oblon, McClelland, Maier & Neustadt, L.L.P.

(57) ABSTRACT

A carrier coordination device and system, a communications device and method, and a measurement device and method. The carrier coordination device includes: a receiving unit, used to receive interference information for describing interference suffered by a user equipment; and a coordination unit, used to determine an interfering source base station of the user equipment according to the interference information, and coordinate carrier use of the user equipment and/or the interfering source base station at least based on the interference information and carrier state information of the interfering source base station, to reduce the interference suffered by the user equipment. The technology can be applied in a wireless communications field.

19 Claims, 4 Drawing Sheets

(51) Int. Cl.
*H04L 5/00* (2006.01)
*H04W 24/02* (2009.01)
*H04W 72/04* (2009.01)
*H04L 5/14* (2006.01)

(52) U.S. Cl.
CPC ........... *H04L 5/0092* (2013.01); *H04W 24/02* (2013.01); *H04W 72/082* (2013.01); *H04L 5/006* (2013.01); *H04L 5/14* (2013.01); *H04W 72/0453* (2013.01)

(56) References Cited

U.S. PATENT DOCUMENTS

2011/0317820 A1\* 12/2011 Torgersrud .......... H04M 3/4228
 379/88.09
2012/0243638 A1\* 9/2012 Maltsev ............ H04W 72/0453
 375/316

\* cited by examiner

CARRIER COORDINATION DEVICE AND SYSTEM, COMMUNICATIONS DEVICE AND METHOD, AND MEASUREMENT DEVICE AND METHOD

FIELD OF THE INVENTION

The invention relates to the field of communication, and particularly to a carrier coordination device, a carrier coordination method, a communication device, a communication method, a measurement device and a measurement method.

BACKGROUND OF THE INVENTION

An LTE-Advanced (LTE-A) system requires realization of peak rates of downlink 1 Gbps and uplink 500 Mbps in a frequency band of 100 MHz. To operate at such a broad carrier frequency, 3GPP introduces Carrier Aggregation (CA) technology, so as to achieve a high frequency band utilization rate. Besides, 3GPP presents stricter requirements for performances of cell edge users, and in particular in a case where edges of a hierarchical heterogeneous network increase and performances of edge users are very poor, a wireless communication system needs a more efficient interference coordination scheme to reduce interference, so as to achieve improvement in the performances of edge users. In 3GPP version 10, a Component Carrier Select scheme is regarded as being an important interference coordination scheme in the hierarchical heterogeneous network based on the CA technology. In the LTE-A system, in particular in a scene where a Macro Base Station and a Small Cell co-exist, on one hand, some small cells make, in an access manner of closed subscriber group, edge users out of access lists thereof suffer serious interference and even fail to obtain services. On the other hand, dense deployment of small cells causes great interference to the edge users of the small cells, such that the performances of the edge users deteriorate significantly. An application of the Component Carrier Select scheme in such scenes improves the performances of the edge users greatly, and has already become a research stress of LTE-A interference coordination.

SUMMARY OF THE INVENTION

A brief summary of the invention will be given below to provide basic understanding of some aspects of the invention. However, it shall be appreciated that this summary is neither exhaustively descriptive of the invention nor intended to define essential or important components or the scope of the invention but is merely for the purpose of presenting some concepts of the invention in a simplified form and hereby acts as a preamble of more detailed descriptions which will be presented later.

In this regard, the invention provides a carrier coordination device, a carrier coordination method, a communication device, a communication method, a measurement device and a measurement method, so as to coordinate carrier use of a user equipment and/or an interference source base station based upon interference information and carrier state information of the interference source base station.

According to one aspect of the invention, there is provided a carrier coordination device in a wireless communication system, the carrier coordination device including: a reception unit configured to receive interference information describing interference suffered by a user equipment; and a coordination unit configured to determine an interference source base station of the user equipment according to the interference information and to coordinate carrier use of the user equipment and/or the interference source base station based upon at least the interference information and carrier state information of the interference source base station to reduce the interference suffered by the user equipment.

According to another aspect of the invention, there is further provided a communication device in a wireless communication system, the communication device including: a communication unit configured to configure carrier resources in a corresponding communication range, wherein the communication unit is further configured to obtain carrier state information in the corresponding communication range and to send the obtained carrier state information to the carrier coordination device as described above.

According to another aspect of the invention, there is further provided a measurement device in a wireless communication system, the measurement device including: a measurement unit configured to receive measurement configuration information from a corresponding base station, to measure respective corresponding carriers according to the measurement configuration information and to send a result of the measurement to the base station as carrier state information.

According to another aspect of the invention, there is further provided a communication device in a wireless communication system, the communication device including: a communication unit configured to receive interference information describing interference suffered by a user equipment in a coverage thereof, to send the interference information to the carrier coordination device as described above, to receive a carrier resource configuration instruction from the carrier coordination device or carrier state information of an interference source base station, and to perform corresponding processing on the user equipment subjected to the interference according to the carrier resource configuration instruction or the carrier state information of the interference source base station.

According to another aspect of the invention, there is further provided a communication device in a wireless communication system, the communication device including: a communication unit configured to send interference information describing interference suffered by the communication device to a service cell base station thereof, to receive a carrier switching command from the service cell base station, and to perform carrier switching according to the carrier switching command so as to select an appropriate carrier as a component carrier of the communication device to reduce the interference.

According to another aspect of the invention, there is further provided a carrier coordination method in a wireless communication system, the method including: receiving interference information describing interference suffered by a user equipment; and determining an interference source base station of the user equipment according to the interference information and coordinating carrier use of the user equipment and/or the interference source base station based upon at least the interference information and carrier state information of the interference source base station to reduce the interference suffered by the user equipment.

According to another aspect of the invention, there is further provided a communication method in a wireless communication system of configuring carrier resources in a corresponding communication range, wherein the communication method includes: obtaining carrier state information in the corresponding communication range and sending the obtained carrier state information to the carrier coordination device as described above.

According to another aspect of the invention, there is further provided a measurement method in a wireless communication system, the measurement method including: receiving measurement configuration information from a corresponding base station, measuring respective corresponding carriers according to the measurement configuration information, and sending a result of the measurement to the base station as carrier state information.

According to another aspect of the invention, there is further provided a communication method in a wireless communication system, the communication method including: receiving interference information describing interference suffered by a user equipment in a corresponding coverage, sending the interference information to the carrier coordination device as described above, receiving a carrier resource configuration instruction from the carrier coordination device or carrier state information of an interference source base station, and performing corresponding processing on the user equipment subjected to the interference according to the carrier resource configuration instruction or the carrier state information of the interference source base station.

According to another aspect of the invention, there is further provided a communication method in a wireless communication system, the communication method including: sending interference information describing interference suffered by a user equipment to a service cell base station of the user equipment, receiving a carrier switching command from the service cell base station of the user equipment, and performing carrier switching according to the carrier switching command so as to select an appropriate carrier as a component carrier of the user equipment to reduce the interference.

The foregoing carrier coordination device and carrier coordination method according to embodiments of the invention coordinate carrier use of a user equipment and/or an interference source base station based upon interference information and carrier state information of the interference source base station, making it possible to reduce the interference suffered by the user equipment.

These and other advantages of the invention will become more distinct from detailed descriptions of best embodiments of the invention in combination with accompanying drawings below.

BRIEF DESCRIPTION OF THE DRAWINGS

The invention can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the invention and to explain the principle and advantages of the invention by way of example. In the drawings.

Figure 1A:
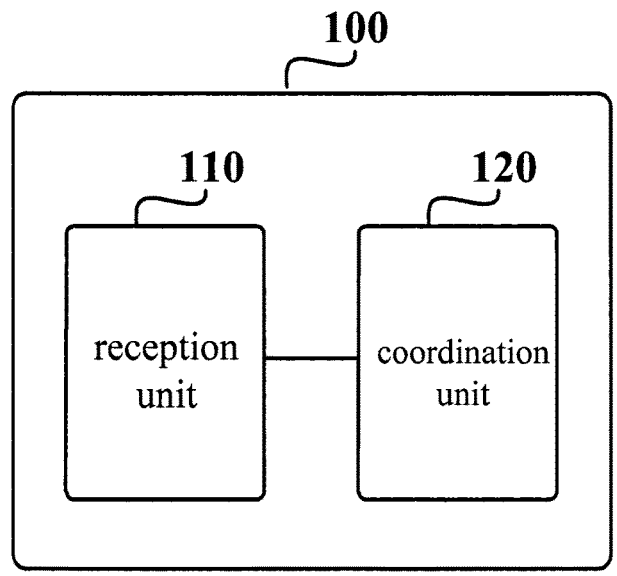
FIG. 1A is a block diagram schematically illustrating an exemplary structure of a carrier coordination device in a wireless communication system according to a first embodiment of the invention.

Those skilled in the art should understand that elements in the accompanying drawings are shown only for the sake of simplicity and clarity, but are not necessarily drawn in scales. For example, sizes of some elements in the accompanying drawings might be enlarged with respect to those of other elements, so as to facilitate understanding of the embodiments of the invention.

DETAILED DESCRIPTION OF THE EMBODIMENTS

Exemplary embodiments of the present invention will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted herein that only those device structures and/or process steps closely relevant to the solutions of the invention are illustrated in the drawings while other details less relevant to the invention are omitted so as not to obscure the invention due to those unnecessary details.

A first embodiment of the invention provides a carrier coordination device in a wireless communication system, the carrier coordination device including: a reception unit configured to receive interference information describing interference suffered by a user equipment; and a coordination unit configured to determine an interference source base station of the user equipment according to the interference information and to coordinate carrier use of the user equipment and/or the interference source base station based upon at least the interference information and carrier state information of the interference source base station to reduce the interference suffered by the user equipment.

Below, an example of the carrier coordination device in the wireless communication system according to the first embodiment of the invention will be described in detail in combination with FIG. 1A.

As shown in FIG. 1A, a carrier coordination device 100 according to the first embodiment of the invention includes a reception unit 110 and a coordination unit 120.

The reception unit 110 is configured to receive interference information from a user equipment, and the interference information is used for describing interference suffered by the user equipment.

In one implementation of the carrier coordination device 100 according to the first embodiment of the invention, the interference information may be obtained through measurement by the user equipment, for example, in an FDD system, the system can configure a user equipment to implement the measurement via an air interface signaling. In another implementation, the interference information may also be obtained through measurement by a service base station of the user equipment, for example, in a TDD system, the measurement may be implemented by configuring a measurement device on the service base station of the user equipment. It should be noted that, in the TDD system, the interference information may also be obtained through measurement by the user equipment.

Figure 1B:
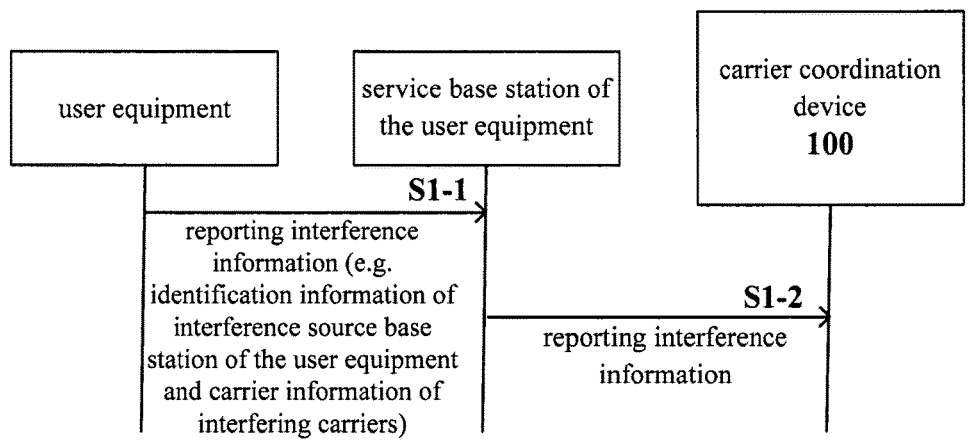
FIG. 1B is a schematic diagram illustrating an exemplary processing of reporting interference information.
Figure 1C:
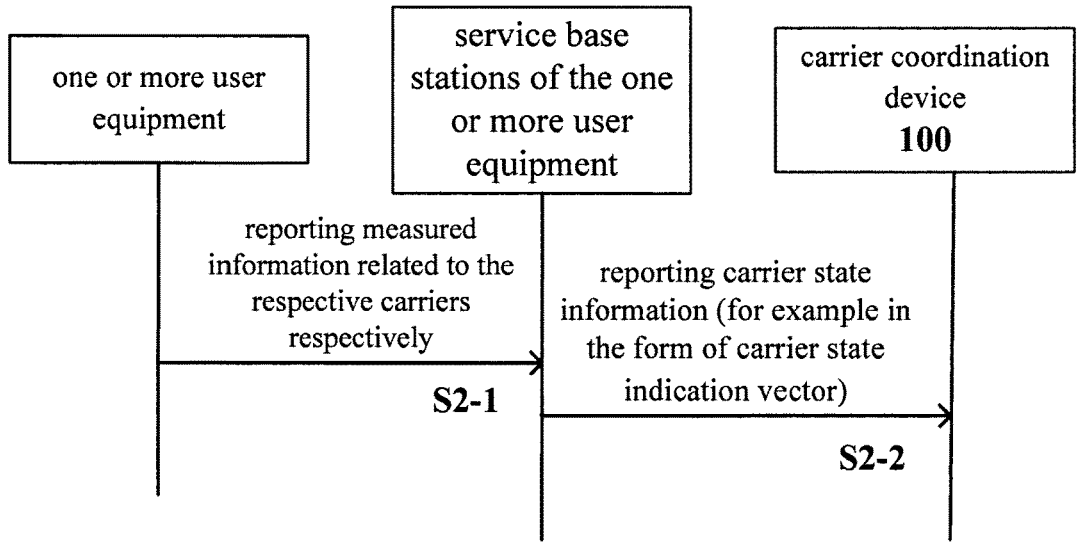
FIG. 1C and FIG. 1D are schematic diagrams illustrating two exemplary processing of reporting carrier state information.

In addition, it should be noted that in the case where the interference information is obtained through measurement by the user equipment, the user equipment for example can report the interference information to the service base station of the user equipment (as shown in step S1-1 in FIG. 1B), and then the interference information is reported to the carrier coordination device 100 by the service base station (the interference information may be received by the receiving unit 110) (as shown in step S1-2 in FIG. 1B). It should be noted that in FIG. 1B and FIGS. 1C to 1E to be described hereinafter, an up-and-down position order of the respective steps in the figures reflects a temporal order in which the respective steps are performed, and arrows corresponding to the respective steps point to transmission directions of corresponding information or instructions. For example, in FIG. 1B, the step S1-1 is performed prior to the step S1-2, and information transmission directions of both the step S1-1 and the step S1-2 are from left to right.

In one implementation of the carrier coordination device 100 according to the first embodiment of the invention, the interference information for example may include identification information of an interference source base station of the user equipment and carrier information representing a carrier or carriers producing interference to the user equipment among all carriers used by the interference source base station. It should be noted that the interference source base station of the user equipment may include one or more base stations which produce interference to the user equipment. For the sake of convenience, the carrier producing interference to the user equipment used by the interference source base station is referred to as "interfering carrier".

In one specific implementation, identification information of a certain base station for example may include a name or an ID or the like of the base station.

In addition, in one specific implementation, carrier information of the interfering carrier for example may include a name or an ID of the interfering carrier.

In another specific implementation, carrier information of the interfering carrier may also include, in addition to the name or ID of the interfering carrier, related information of the interference source base station related to the interfering carrier, such as the number of users using the interfering carrier within coverage of the interference source base station related to the interfering carrier and so on.

In one example, it is assumed that an ID of a service base station of a user equipment $UE_0$ is "base station 1", and it is assumed that there are a total of two base stations producing interference to the user equipment $UE_0$, IDs of the two interference source base stations being "base station 3" and "base station 6" respectively. Particularly, a carrier CC3 of operating carriers used by the base station 3 produces interference to the user equipment $UE_0$, and a carrier CC2 of operating carriers used by the base station 6 produces interference to the user equipment $UE_0$. In the example, the interference information for example may be represented in the form as shown in Table 1.

TABLE 1

| IDs of Interfering Carriers | IDs of Interference Source Base Stations |
|---|---|
| CC3 | Base station 3 |
| CC2 | Base station 6 |

Thus, in one implementation of the carrier coordination device 100 according to the first embodiment of the invention, after the reception unit 110 receives (directly or indirectly) the interference information from the user equipment, the coordination unit 120 may determine the interference source base station of the user equipment according to the interference information, and can coordinate carrier use of the user equipment and the interference source base station based upon at least the interference information and carrier state information of the interference source base station to reduce the interference suffered by the user equipment.

In another implementation of the carrier coordination device 100 according to the first embodiment of the invention, the coordination unit 120 may serve as a database for saving the carrier state information of the respective base stations, and can inform the related information of the interference source base station of the user equipment (such as the ID or name and/or carrier state information and so on of the interference source base station of the user equipment) in response to a query request of the service base station of the user equipment, but does not manage configuration at user levels (but may manage and control at base station levels, for example require the interference source base station to switch carriers and so on).

In addition, in one implementation of the carrier coordination device 100 according to the first embodiment of the invention, the carrier state information may include state parameters of available carriers of a corresponding base station, and carrier information representing carriers having been used by the corresponding base station. It should be noted that the state parameters of the available carriers can reflect which available carriers are described by the state parameters.

It should be noted that, for a certain base station (e.g. a small cell base station or a macro base station in the wireless communication system), "available carriers" of the base station refer to carriers that can be configured but have not yet been used by the base station; and "carriers having been used" by the base station refer to operating carriers currently being used by the base station.

In one specific implementation, state parameters of any available carrier of a certain base station (e.g. the small cell base station or the macro base station in the wireless communication system) for example may include a channel state corresponding to the available carrier. For a person skilled in the art, the technology for obtaining the channel states of the available carriers can be obtained by combining common knowledge and/or public data, and thus will not be described in detail herein.

In addition, in one specific implementation, carrier information of any used carrier of a certain base station (e.g. the small cell base station or the macro base station in the wireless communication system) for example may include a name or an ID of the used carrier.

In one example, it is assumed that available carriers of a certain base station are CC1, CC2 and CC3, channel states of the carriers CC1, CC2 and CC3 being $S_{CC1}$, $S_{CC2}$ and $S_{CC3}$ respectively, and it is assumed that carriers having been used by the base station are CC4 and CC5. Thus, carrier state information of the base station for example may be represented in the form as shown in Table 2.

TABLE 2

| State Parameters of Available Carriers | IDs of Used Carriers |
|---|---|
| CC1: $S_{CC1}$ | CC4 |
| CC2: $S_{CC2}$ | CC5 |
| CC3: $S_{CC3}$ | |

In another specific implementation, carrier information of any used carrier of a certain base station (e.g. the small cell base station or the macro base station in the wireless communication system) may include, in addition to the name or the ID of the used carrier, related information of a base station corresponding to the used carrier, such as the number of users using the used carrier within coverage of the base station corresponding to the used carrier and so on.

It should be noted that, in one implementation of the carrier coordination device 100 according to the first embodiment of the invention (for example in the FDD system or the TDD system), the related information of the respective carriers (such as the state parameters of the respective available carriers, carrier information of the respective used carriers, and so on) may be obtained in advance through measurement by one or more user equipment in a cell (for example a macro cell or a small cell). Then, the one or more user equipment report the related information obtained through measurement to a service base station of the one or more user equipment (as shown in step S2-1 in FIG. 1C), so as to obtain carrier state information of the base station of this cell by the base station of this cell utilizing this information. In this case, the service base station of the one or more user equipment may report the obtained carrier state information related to the service base station itself (for example in the form of a carrier state indication vector to be mentioned hereinafter) to the carrier coordination device 100 (as shown in step S2-2 in FIG. 1C). Thus, a plurality of cell base stations (e.g. a plurality of small cell base stations; or a plurality of small cell base stations and macro base stations) in the wireless communication system may report the carrier state information of themselves to the carrier coordination device 100 respectively, thereby making it possible for the carrier state information to be stored in advance in the carrier coordination device 100 (for example to be stored in the coordination unit 120 or in a storage unit in the carrier coordination device 100). For a person skilled in the art, the measurement processing performed by the one or more user equipment may be obtained by combining common knowledge and/or public data, and thus will not be described in detail herein. The FDD system refers to a Frequency Division Duplexing system, and the TDD system refers to a Time Division Duplexing system.

Figure 1D:
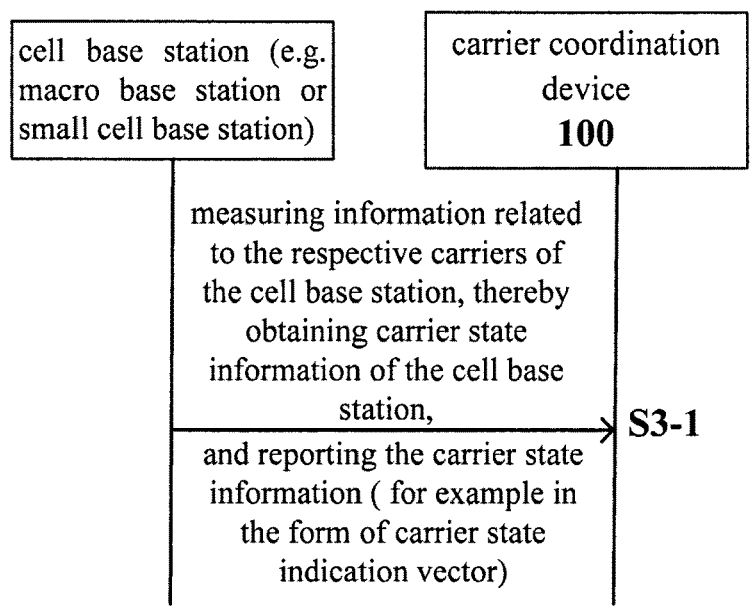

In addition, in another implementation of the carrier coordination device 100 according to the first embodiment of the invention (for example in a TDD system), as shown in step S3-1 in FIG. 1D, the measurement of the related information of the respective carriers (such as the state parameters of the respective available carriers, the carrier information of the respective used carriers, and so on) of a cell (e.g. a macro cell or a small cell) base station may also be implemented by the cell base station itself, and the cell (including the small cell) base station may obtain the carrier state information of itself (for example in the form of the carrier state indication vector to be mentioned hereinafter) from this information and may report the carrier state information to the carrier coordination device 100. Thus, a plurality of cell (including a small cell) base stations in the wireless communication system may report the carrier state information of themselves to the carrier coordination device 100 respectively, thereby making it possible for the carrier state information to be stored in advance in the carrier coordination device 100 (for example to be stored in the coordination unit 120 or in a storage unit in the carrier coordination device 100). For a person skilled in the art, the measurement processing performed by the cell (including the small cell) base station may be obtained by combining common knowledge and/or public data, and thus will not be described in detail herein.

In practical application, during the process where one or more measurement devices (the measurement device for example is a user equipment or a cell base station per se) in a cell (e.g. a macro cell or a small cell) perform measurement on all available carriers and used carriers of this cell, the measurement device for example may perform the measurement according to an LTE-A standard, and may also perform inter-frequency measurement using techniques such as Cognitive Radio and so on. Measured indices for example are CSI-RSRP (Channel State Information-Reference Signal Receiving Power) in systems of Release-10 version and later, and for example are RSRP (Reference Signal Receiving Power) in systems prior to Release-10 version. In addition, the measurement device for example may represent measurement conditions on all the available carriers and the used carriers in forms of such as CSI (Channel State Information), CQI (Channel Quality Indicator) and so on.

In one implementation of the carrier coordination device 100 according to the first embodiment of the invention, the carrier state information may be represented in the form of a carrier state indication vector. The carrier state indication vector contains state parameters of available carriers of a corresponding base station and carrier information representing carriers having been used by the corresponding base station.

In one example, the carrier state information as shown in Table 2 above for example may be represented as the following carrier state indication vector (hereinafter referred to as "exemplary vector 1") or a similar form:

(CC1: SCC1, CC2: SCC2, CC3: SCC3, CC4:U, CC5:U)

In the exemplary vector 1, in a case where there is a parameter (such as SCC1 and so on) following the colon, the parameter is a state parameter of the carrier preceding the colon, and in this case it is indicated that the carrier preceding the colon is an available carrier of the base station (the base station corresponding to the carrier state information). In addition, in a case where there is "U" (or other preset symbols and the like) following the colon, it is indicated that the carrier preceding the colon is a carrier having been used by the base station.

In another example, the carrier state indication vector may reflect a priority order of the respective available carriers of the base station corresponding to the carrier state indication vector. In this case, for example priority scores of the respective available carriers may be used to represent the state parameters thereof. For example, the state parameters of the respective available carriers may be scalar values reflecting priorities of the respective available carriers which are obtained by comprehensively considering at least one of information such as an interference condition, a carrier load and so on. Still taking the carrier state information as shown in Table 2 above as an example, and assuming that the priority scores of the carriers CC1, CC2 and CC3 are 2, 1 and 3 respectively, thus, the carrier state information may be represented as the following carrier state indication vector (hereinafter referred to as "exemplary vector 2") or a similar form:

(CC1: 2, CC2: 1, CC3: 3, CC4: U, CC5: U)

In the exemplary vector 2, a larger priority score for example may represent a higher priority of an available carrier corresponding thereto, thus, among the carriers CC1, CC2 and CC3, the priority of the carrier CC3 is the highest.

In addition, in other examples, a priority score corresponding to an available carrier having a higher priority may also be set to be smaller; and in this case, among the carriers CC1, CC2 and CC3, the priority of the carrier CC2 is the highest.

In addition, in one specific implementation, the priority order of the respective available carriers may be set according to the state parameters of the respective available carriers. For example, the respective available carriers may be ranked according to at least one of state parameters such as CSI, CSI-RSRP, CQI and so on of the respective available carriers, and the available carrier with a higher rank has a higher priority.

In one implementation of the carrier coordination device 100 according to the first embodiment of the invention, after the coordination unit 120 determines the interference source base station of the user equipment according to the interference information received by the reception unit 110, the coordination unit 120 may coordinate carrier use of the user equipment and/or the interference source base station based upon carrier state information of a plurality of base stations including the interference source base station and the service base station of the user equipment. Particularly, the "plurality of base stations including the interference source base station and the service base station of the user equipment" mentioned herein for example may be all base stations in a certain coordination set including the interference source base station and the service base station of the user equipment, or, may also be part of base stations in the coordination set (for example, the service base station of the user equipment and cell base stations adjacent thereto in the coordination set).

In one example, the coordination set for example may be obtained by performing clustering processing on all cell (for example including a macro cell and a small cell) base stations in the wireless communication system in advance. For example, all cell base stations in the wireless communication system may be divided based upon at least one of a coupling loss, a link loss and a geographical location, using a clustering algorithm, to obtain a plurality of subsets, each subset including one or more cell base stations, and the each subset may serve as a carrier selection coordination set (i.e. a "coordination set").

In addition, in one example, the carrier state information of the "plurality of base stations including the interference source base station and the service base station of the user equipment" for example may be determined by the coordination unit 120 according to a predetermined carrier state indication set. Particularly, the predetermined carrier state indication set for example may include identification information of the "plurality of base stations including the interference source base station and the service base station of the user equipment" and carrier state information corresponding to each of the plurality of base stations.

In addition, in one specific implementation, the coordination unit 120 may periodically (or in a triggering manner) update the aforementioned carrier state indication set. For example, the carrier coordination device 100 may obtain the carrier state information corresponding to each of the plurality of base stations corresponding to the carrier state indication set, through periodical (or in a case that a predetermined triggering condition is satisfied) communications among the plurality of base stations corresponding to the carrier state indication set, so as to update the carrier state instruction set, thereby realizing maintenance of the carrier state indication set. In addition, the plurality of base stations corresponding to the carrier state indication set may also obtain carrier state information corresponding thereto through periodical measurement, such that the plurality of base stations can periodically report their respective corresponding carrier state information to the carrier coordination device 100 to thereby obtain an updated carrier state indication set, so as to realize maintenance of the carrier state indication set.

In one example, the carrier state indication set may be represented in the form as shown in the following Table 3.

TABLE 3

|  | Base Station 1 | Base Station 2 | ... | Base Station $N_0$ |
|---|---|---|---|---|
| CC1 | U | U | ... | 1 |
| CC2 | U | 2 | ... | 3 |
| CC3 | 1 | 1 | ... | 2 |
| CC4 | 2 | U | ... | U |

In the example as shown in Table 3, the carrier state indication set contains carrier state information of $N_0$ base stations (such as small cell base stations, macro base stations and so on), where $N_0$ is a positive integer. In the example, the carriers having been used by the base station 1 include carriers CC1 and CC2, the carriers having been used by the base station 2 include carriers CC1 and CC4, . . . , the carriers having been used by the base station $N_0$ include carrier CC4; the available carriers of the base station 1 include carriers CC3 and CC4, where the priority of the carrier CC3 is higher than the priority of the carrier CC4 (it is assumed that in the example smaller numbers represent higher priorities), the available carriers of the base station 2 include carriers CC2 and CC3, where the priority of the carrier CC3 is higher than the priority of the carrier CC2, . . . , the available carriers of the base station $N_0$ include carriers CC1, CC2 and CC3, where the priority of the carrier CC1 is higher than the priority of the carrier CC3, and the priority of the carrier CC3 is higher than the priority of the carrier CC2.

In one implementation of the carrier coordination device 100 according to the first embodiment of the invention, after the reception unit 110 receives the interference information, the coordination unit 120 may allocate, based upon the interference information and the carrier state information of the interference source base station (the carrier state information of the interference source base station for example may be obtained according to the interference information in combination with the aforementioned carrier state indication set), carriers with lower interference which are not used by the interference source base station (e.g. carriers with interference below a predetermined interference threshold or one or more carriers with the lowest interference) from configurable carriers of the service base station of the user equipment for use by the user equipment. For example, in an example where the base station 1 is the service base station and the base station 2 and the base station $N_O$ are the interference source base stations, the carrier CC3 being used by none of the interference source base stations among the configurable carriers (CC1, CC2, CC3, CC4) of the service base station may be allocated for use by the user equipment. It should be noted that remaining resources of the carriers allocated from the carriers of the service base station can accept the user equipment. For the sake of convenience, the processing of "re-allocating carriers from the configurable carriers of the service base station for use by the user equipment" by the coordination unit 120 is hereinafter referred to as "carrier allocation processing".

In one example, it is assumed that a certain user equipment served by the base station 1 suffers interference from the base station 3 and the base station 6, the interference information being as shown in the above Table 1. In addition, assuming that the portions related to the base station 1, the base station 3 and the base station 6 which are contained in the carrier state indication set are as shown in Table 4, it would be readily obtained from Table 4 that the carriers having been used by the base station 3 include the carrier CC3, and that the carriers having been used by the base station 6 include the carriers CC1 and CC2. Neither of the base station 3 and the base station 6 uses the available carrier CC4 of the base station 1. Thus, the coordination unit 120 may allocate the carrier CC4 for use by the user equipment of the base station 1. In another example, the base station 1 further has an available carrier CC5 (not shown in Table 4), and assuming that both the base stations 3 and 6 are unable to configure the carrier CC5, the carrier CC5 may be allocated for use by the user equipment, thereby making it possible to ensure the user equipment to be free of interference from the base stations 3 and 6.

TABLE 4

|     | Base Station 1 | Base Station 3 | Base Station 6 |
|-----|----------------|----------------|----------------|
| CC1 | 1              | 1              | U              |
| CC2 | U              | 2              | U              |
| CC3 | U              | U              | 1              |
| CC4 | 2              | 3              | 2              |

In addition, in another implementation of the carrier coordination device 100 according to the first embodiment of the invention, the coordination unit 120 may also instruct, based upon the interference information and the carrier state information of the interference source base station, the service base station of the user equipment and other base stations in the same cluster as the interference source base station and the service base station, the interference source base station to switch from a used carrier thereof with interference to the user equipment to anther available carrier. For example, stilling taking Table 4 as an example, the coordination unit 120 may obtain, based upon the interference information and the carrier state information of the interference source base stations (i.e. the base stations 3 and 6) and carrier state information of the service base station (i.e. the base station 1) of the user equipment, that the base station 3 may switch from the carrier CC3 to the carrier CC1, and that the base station 6 may switch from the carrier CC2 to the carrier CC4. Besides, it is assumed that it can be obtained, according to carrier state information of other base stations in the same cluster as the interference source base stations and the service base station of the user equipment, that switching to the carrier CC1 of the base station 3 and switching to the carrier CC4 of the base station 6 would produce no interference to other base stations in the same cluster, thereby making it possible to ensure the user equipment to be free of interference from the base stations 3 and 6.

In another implementation, after the reception unit 110 receives the interference information, the coordination unit 120 may also instruct the interference source base station to reserve at least a part of resources with interference to the user equipment in used carriers thereof, so that no data is transmitted over the reserved at least part of the resources. Thus, the coordination unit 120 may instruct the service base station of the user equipment to allocate the at least part of resources included in the configurable carriers thereof which are reserved by the interference source base station for use by the user equipment. For the sake of convenience, the processing of "instructing the interference source base station to reserve at least a part of resources with interference to the user equipment in used carriers thereof" by the coordination unit 120 is hereinafter referred to as "resource reservation processing".

In addition, in one implementation of the carrier coordination device 100 according to the first embodiment of the invention, the reception unit 110 for example may receive carrier selection/coordination request information, comprising the aforementioned interference information, from the user equipment.

In this case, when the user equipment sends the carrier selection/coordination request information to the carrier coordination device 100, the carrier coordination device 100 for example may perform subsequent processing according to the request (i.e. the carrier selection/coordination request information), and the subsequent processing for example may be performed with reference to the aforementioned various processing performed by the coordination unit 120.

Figure 1E:
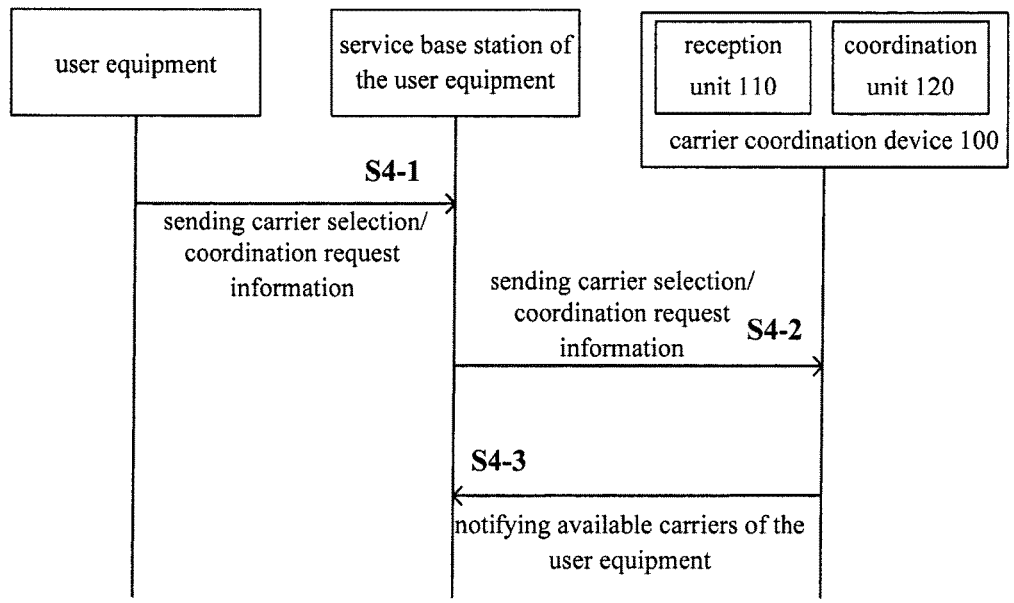
FIG. 1E is a schematic diagram illustrating exemplary processing of reporting carrier selection/coordination request information and issuing a carrier selection result.

In one example, after the reception unit 110 receives the carrier selection/coordination request information from the user equipment, the coordination unit 120 for example may coordinate carrier use of the respective base stations related to the carrier selection/coordination request information according to the aforementioned carrier state indication set. For example, as shown in FIG. 1E, the user equipment sends the carrier selection/coordination request information to the service base station thereof (as shown in step S4-1 in FIG. 1E), and the carrier selection/coordination request information is forwarded to the reception unit 110 in the carrier coordination device 100 by the service base station of the user equipment (as shown in step S4-2 in FIG. 1E). After the reception unit 110 receives the carrier selection/coordination request information from the user equipment, the coordination unit 120 may obtain current carrier state information of the service base station of the user equipment (for example, state parameters of available carriers and carrier information of used carriers of the service base station of the user equipment) according to the aforementioned carrier state indication set. Then, according to the current carrier state information of the service base station of the user equipment in combination with the aforementioned carrier state indication set, the coordination unit 120 may determine available carriers of the user equipment, and notify the determined result (as a carrier selection result) to the service base station of the user equipment, thereby making it possible to perform corresponding configuration on the user equipment by the service base station of the user equipment (as shown in step S4-3 in FIG. 1E). Particularly, the service base station of the user equipment is included in a plurality of base stations corresponding to the aforementioned carrier state indication set.

Below, examples of determining the available carriers of the user equipment by the coordination unit 120 will be described by way of example.

In one example (hereinafter referred to as example 1), the coordination unit 120 may estimate interference suffered by the user equipment when the user equipment uses respective carriers of the service base station of the user equipment (the interference may be either an absolute interference value or a relative interference value) according to the current carrier state information of the service base station of the user equipment and carrier state information of other related base stations (e.g. adjacent base stations of the service base station of the user equipment), and select a carrier with interference less than or equal to a predetermined threshold for use by the user equipment (the above processing performed by the coordination unit 120 in the example 1 is hereinafter referred to as "carrier regulation"). It should be noted that the respective carriers of the service base station of the user equipment for example may be all configurable carriers of the service base station (e.g. all available carriers and all used carriers of the service base station). In addition, it should also be noted that the "carrier with interference less than or equal to a predetermined threshold" selected by the coordination unit 120 may either be one carrier or be a plurality of carriers (e.g. in a case of carrier aggregation). In one example, the coordination unit 120 may initiate the "carrier regulation" in the example 1 after receiving the carrier selection/coordination request information from the user equipment. In another example, the coordination unit 120 may also judge, according to for example interference information timed to be transmitted, whether interference is greater than a predetermined threshold (for example, it may be determined according to experience or by means of experiments), and initiate the "carrier regulation" in the example 1 if the interference is greater than the predetermined threshold.

For example, in the example as shown in Table 5 below, it is assumed that carriers being used by a certain user equipment served by the base station 1 are the carriers CC2 and CC3, which suffers interference from the base station 3 and the base station 6. In addition, it is assumed that all users of the base station 1 who suffer interference can be configured to use the carriers CC1-CC4, and it is assumed that base stations corresponding to the carrier state indication set include a total of six base stations, i.e. the base stations 1 to 6. As could be obtained from Table 5, interference suffered by the users of the base station 1 when using the available carrier CC1 of the base station 1 includes interference from a total of four base stations, i.e. the base station 2, the base station 4, the base station 5 and the base station 6; interference suffered by the users of the base station 1 when using the used carrier CC2 of the base station 1 includes interference from only one base station i.e. the base station 6; interference suffered by the users of the base station 1 when using the used carrier CC3 of the base station 1 includes interference from only the base station 3; and the users of the base station 1 would suffer no interference from any one of the base station 1 to the base station 6 when using the available carrier CC4 of the base station 1. In the example, it is assumed that the users suffer one unit of relative interference value per interference from one base station; thus, the users suffer 4 relative interference values when using the carrier CC1, suffer 1 relative interference value when using the carrier CC2, suffer 1 relative interference value when using the carrier CC3, and suffer 0 relative interference value when using the carrier CC4. If the predetermined threshold is 1 relative interference value, the coordination unit 120 may allocate any one of the carrier CC2, the carrier CC3 and the carrier CC4 for use by the above users, for example, allocate the carrier CC4 with the lowest interference for use by the users. If the predetermined threshold is 0.5 relative interference value, the coordination unit 120 may allocate the carrier CC4 for use by the above users.

TABLE 5

|     | Base Station 1 | Base Station 2 | Base Station 3 | Base Station 4 | Base Station 5 | Base Station 6 |
|-----|---|---|---|---|---|---|
| CC1 | 1 | U | 1 | U | U | U |
| CC2 | U | 1 | 2 | 3 | 1 | U |
| CC3 | U | 2 | U | 2 | 3 | 1 |
| CC4 | 2 | 3 | 3 | 1 | 2 | 2 |

In another example (hereinafter referred to as example 2), it is assumed that when more than one available carrier with interference less than or equal to a predetermined threshold is obtained by the coordination unit 120 in the same way as the processing in the example 1, the coordination unit 120 may select, according to a priority order of the respective available carriers, one (e.g. the one with the highest priority) from the available carriers with interference less than or equal to a predetermined threshold, and/or the used carriers as carriers to be used by the user equipment (i.e. operating carriers of the user equipment). In the example, it is assumed that the priority of the used carriers is higher than the priority of the available carriers. In addition, priorities among a plurality of used carriers may also be set according to a method similar to the aforementioned method for setting the priorities of the available carriers, which will not be described redundantly herein. For example, in the example as shown in Table 5, in the case where the predetermined threshold is 1 relative interference value, the coordination unit 120 may allocate the one with the highest priority among the carrier CC2, the carrier CC3 and the carrier CC4 for use by the above users. Particularly, the priorities of the carrier CC2 and the carrier CC3 are higher than the priority of the carrier CC4, and assuming that the priority of the carrier CC2 is higher than the priority of the carrier CC3, the coordination unit 120 may allocate the carrier CC2 for use by the above users.

In addition, in a further example (hereinafter referred to as example 3), it is assumed that when interference suffered by the user equipment when using each carrier of the service base station thereof, which is obtained by the coordination unit 120 in the same way as the processing in the example 1, is greater than the predetermined threshold, or in a case where carriers of the service base station with interference less than the predetermined threshold cannot be allocated to the user equipment (e.g. overloaded), the coordination unit 120 may instruct the interference source base station of the user equipment to perform corresponding carrier switching such that interference suffered by the user equipment after the interference source base station performs the carrier switching is less than or equal to the predetermined threshold. For example, assuming that it is impossible to make interference suffered by the user equipment less than or equal to the predetermined threshold no matter which carriers (available carriers or used carriers) of the service base station are used by the user equipment, then the coordination unit 120 may instruct the interference source base station of the user equipment to perform carrier switching, so as to enable interference to the user equipment which is produced by carriers to be used by the interference source base station after the switching is performed to be less than or equal to the predetermined threshold. Specifically, if the interference source base station intends to perform carrier switching, for example if the base station 3 in Table 5 intends to switch from the currently used carrier CC3 to the carrier CC1, all user equipment of the base station 3 which originally use the carrier CC3 shall be switched to the carrier CC1; if switching of some or all of the user equipment fails, the carrier switching performed by the interference source base station fails. Thus, the interference source base station may also feed back to the carrier coordination device a message as to failure or success of the switching. In an example where there are a plurality of interference source base stations, if only some of the interference source base stations perform the carrier switching successfully, interference suffered by the user equipment still would possibly exceed the predetermined threshold; in this case, the coordination unit 120 may also further instruct the service base station of the user equipment to re-allocate carriers to the user equipment according to the method in the example 1. In addition, in the case where interference suffered by the user equipment when using each carrier of the service base station, which is obtained by the coordination unit 120 in the same way as the processing in the example 1, is greater than the predetermined threshold, the coordination unit 120 may also instruct the interference source base station to reserve at least a part of resources with interference to the user equipment in carriers being used by the interference source base station (the aforementioned resource reservation processing) so that no data is transmitted over the reserved at least part of the resources.

In addition, in one example (hereinafter referred to as example 4), the coordination unit 120 may determine a type of a scene where the user equipment locates according to the carrier state information of the service base station of the user equipment, and further determine which processing is performed according to the type of the scene where the user equipment locates, that is, determine whether to perform the carrier allocation processing or the resource reservation processing.

In the example 4, when the coordination unit 120 determines that the user equipment locates in a scene with coordination difficulty or a dense cell scene, the coordination unit 120 for example may perform the resource reservation processing.

In addition, in the example 4, when the coordination unit 120 determines that the user equipment locates in the dense cell scene, the coordination unit 120 for example may perform the carrier allocation processing.

It should be noted that the scene with coordination difficulty refers to a scene in which allocation satisfying a carrier resource request of the users suffering interference cannot be performed according to the foregoing methods (e.g. the methods in the example 1 to the example 3). In one example, if a small cell base station denies a compulsory carrier switching requirement of the carrier coordination device according to a load condition of the current operating carriers and sends a carrier compulsory switching failure instruction to the carrier coordination device, the carrier coordination device can determine the scene as the scene with coordination difficulty after receiving the carrier compulsory switching failure instruction.

In addition, the dense cell scene refers to a scene in which there is a user equipment suffering interference from two or more of other base stations. In one example, if a macro base station continuously receives reports of interference from different small cell IDs which are made by the same user equipment for many times, the macro base station can determine that this user equipment locates in a dense small cell scene.

As could be seen from the foregoing descriptions, the carrier coordination device according to the first embodiment of the invention coordinates carrier use of the user equipment and/or the interference source base station based upon the interference information of the user equipment and the carrier state information of the interference source base station, making it possible to reduce the interference suffered by the user equipment. In addition, in some implementations, the carrier coordination device can coordinate carrier selection between small cell base stations and the user equipment using the carrier state indication set, such that the overall performance of the system can be improved while ensuring edge performances, thereby making it possible to further realize the balance between edge throughput and total throughput, so as to realize optimized configuration of the system.

Below, application examples of requesting carrier switching by a macro user suffering interference in an LTE-FDD system of the carrier coordination device 100 according to the first embodiment of the invention will be described in combination with FIGS. 2 and 3. The application examples are scene examples in which macro base stations and small cells coexist and the small cells are densely deployed in a 3GPP Rel-11 LTE-FDD system.

Figure 2:
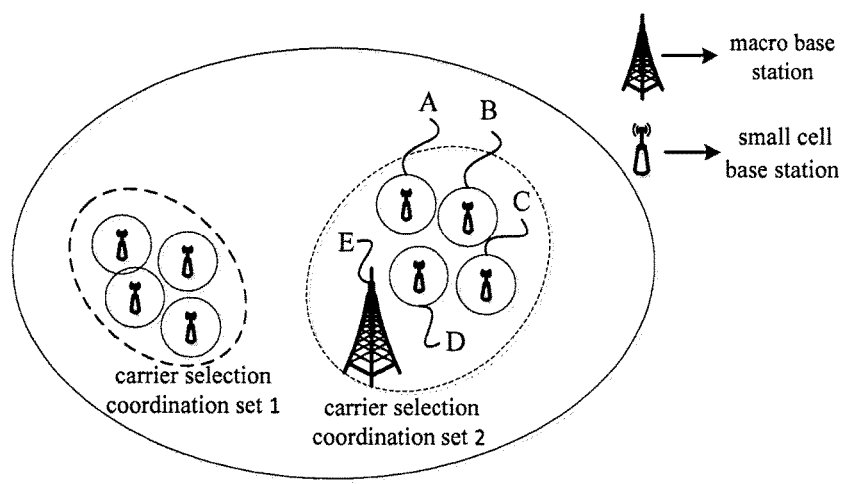
FIG. 2 is a schematic diagram illustrating a possible example of division of a carrier selection coordination set.

As shown in FIG. 2, division of carrier selection coordination sets is performed according to principles such as the link loss, the geographical position and so on, so as to obtain a carrier selection coordination set 1 and a carrier selection coordination set 2.

As shown in FIG. 2, one of small cell base stations in the carrier selection coordination set 1 may be selected as the carrier coordination device 100 corresponding to the carrier selection coordination set 1, or a hardware entity may be installed for the carrier selection coordination set 1 as the carrier coordination device 100 corresponding thereto (not shown in the figure). Similarly, one of small cell base stations in the carrier selection coordination set 2 may be selected as the carrier coordination device 100 corresponding to the carrier selection coordination set 2, or a hardware entity may be installed for the carrier selection coordination set 2 as the carrier coordination device 100 corresponding thereto (not shown in the figure).

A carrier state indication vector of each small cell base station in the carrier selection coordination set 1 is obtained by the foregoing method, so as to obtain a carrier state indication set corresponding to the carrier selection coordination set 1. Similarly, a carrier state indication vector of each small cell base station in the carrier selection coordination set 2 is obtained by the foregoing method, so as to obtain a carrier state indication set corresponding to the carrier selection coordination set 2.

Figure 3:
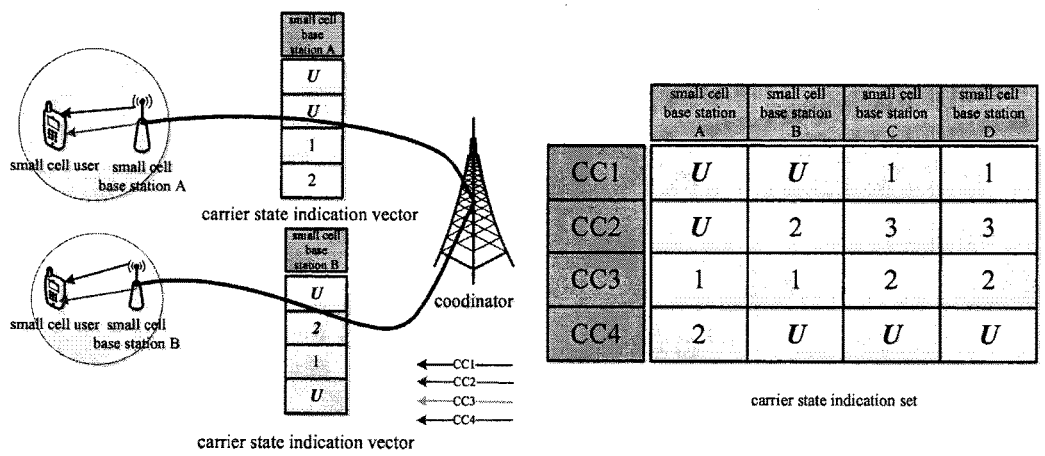
FIG. 3 is a schematic diagram illustrating an example of application of the carrier coordination device according to the first embodiment of the invention in an LTE-FDD system.

As shown in FIG. 3, when suffering strong interference from adjacent small cells, a macro cell user attempts to perform switching, sends a carrier switching request to a macro base station E, and reports IDs of the interference source small cell base stations and the carrier CC1 suffering interference. The macro base station determines, according to the reported IDs of the small cell base stations, that the interference sources are from small cell base stations A and B in the carrier selection coordination set 2, and reports IDs of the interfering cell base stations (i.e. the small cell base stations A and B) and the interfering carrier CC1 to the carrier coordination device 100 corresponding to the carrier selection coordination set 2. The carrier coordination device 100 determines, according to the carrier state indication set, that a switching decision result is the carrier CC3, so the macro base station E is notified to configure the operating carrier of the macro cell user as the carrier CC3. If the macro base station performs a switching process according to the switching decision of the carrier coordination device 100 but the switching fails, the macro base station reports to the carrier coordination device 100 that the switching fails, and the carrier coordination device 100 will perform coordination among the base stations. The carrier coordination device 100 may select, according to the IDs of the small cell base stations and the carrier state indication set, while comprehensively considering load use conditions of the carriers CC1 and CC2 in the corresponding small cells, the carrier CC2 as a reserved carrier of the macro user suffering interference, selects the carrier CC3 as a switching target carrier of the small cell base station A, and notifies the small cell base station A to switch from the carrier CC2 to the carrier CC3. Upon successful switching of the small cell base station A, the carrier coordination device 100 notifies the macro base station to cause the macro user suffering interference to switch to the carrier CC2 reserved by the small cell base station A.

In addition, a second embodiment of the invention further provides a communication device in a wireless communication system, the communication device including: a communication unit configured to configure carrier resources in a corresponding communication range, wherein the communication unit is further configured to obtain carrier state information in the corresponding communication range and to send the obtained carrier state information to the carrier coordination device as described above. The communication device according to the second embodiment of the invention for example may be arranged at the small cell base station side.

In one implementation of the communication device according to the second embodiment of the invention, the communication unit (for example arranged at the small cell base station side) may receive the carrier state information measured by a measurement device (for example arranged at the user equipment side) from the measurement device and configure the measurement device.

In addition, in one implementation of the communication device according to the second embodiment of the invention, the communication unit (for example arranged at the small cell base station side) may construct the carrier state information as a carrier state indication vector and send the carrier state indication vector to the carrier coordination device as described above, wherein the carrier state indication vector includes state parameters of available carriers corresponding to the communication device and carrier information representing carriers having been used by the communication device. In one example, the carrier state indication vector for example may reflect a priority order of the available carriers of the communication device, and the priority order of the available carriers may be set according to the state parameters of the available carriers.

In addition, in one implementation of the communication device according to the second embodiment of the invention, the communication unit (for example arranged at the small cell base station side) may further receive a carrier resource configuration instruction from the carrier coordination device as described above, configure carrier resources used by user equipment in the corresponding communication range according to the carrier resource configuration instruction and send a result of the configuration to the carrier coordination device.

In another implementation of the communication device according to the second embodiment of the invention, if a certain user equipment served by the small cell base station suffers interference and reports interference information thereof to the small cell base station, the communication unit in the communication device which is arranged at the small cell base station side for example may also query, from the carrier coordination device as described above, the carrier state information of the interference source base station which is determined from the interference information, thereby determining a carrier configuration scheme to be executed for the user equipment suffering the interference. It should be noted that in this case, the carrier coordination device only serves as a database for saving the carrier state information of the respective base stations, but does not manage the configuration at user levels (but may manage and control at base station levels, for example require the interference source base station to switch carriers and so on).

In addition, in one implementation of the communication device according to the second embodiment of the invention, the communication unit (for example when initially configuring the carriers) may further receive a carrier use indication from the carrier coordination device as described above to determine a carrier to be used by the communication device according to the carrier use indication, wherein the carrier use indication for example may be determined according to carrier state information of base stations (e.g. adjacent base stations) related to the communication device.

In another implementation of the communication device according to the second embodiment of the invention, the communication unit (for example when initially configuring the carriers) may further receive carrier state information of base stations related to the communication device from the carrier coordination device as described above and estimate interference conditions with respect to adjacent base stations respectively when the communication device configures respective carriers according to the received carrier state information of the base stations related to the communication device to determine a carrier to be used by the communication device. It should be noted that for example the estimation method as described above may be adopted to estimate interference conditions with respect to the adjacent base stations respectively when the communication device configures respective carriers, so a similar method may be adopted to determine the carrier to be used by the communication device, which will not be described in detail herein.

In one application example (hereinafter referred to as application example 1), when a certain cell base station switches from an off state to an on state, measurement on all optional operating carriers of the cell base station may be implemented in advance by the measurement method as described above. Then, cell base stations adjacent to the cell base station may be looked for based upon a measurement result according to a preset principle, wherein the preset principle for example may be that a certain measurement index is less than a preset threshold, or may be determined by comprehensively considering a plurality of measurement indices. If no adjacent cells of the cell base station are found, that is, if interference between the cell base station and other cells is very small, optimal operating carriers of the cell base station may be selected according to the measurement result, and a carrier state indication vector corresponding to the cell base station is generated and is sent to the carrier coordination device 100. Accordingly, initialization of the cell base station is completed.

In addition, if adjacent cells of the cell base station are found, base station IDs of the adjacent cell base stations of the cell base station are reported to the carrier coordination device 100, and interference conditions with respect to the adjacent cell base stations respectively when the cell base station configures different carriers are obtained through query and by combining with carrier use conditions of the adjacent cell base stations in the carrier state indication set, so as to select a carrier producing the smallest influence upon the surrounding adjacent cell base stations as an operating carrier of the cell base station. If the measurement results on the respective carriers are judged, according to a preset criterion, as being relatively poor, or if it is obtained through processing by the carrier coordination device 100 that the cell base station produces a relatively great influence upon the adjacent cell base stations no matter which carrier is configured, a certain carrier or some resources on the certain carrier may be selected to be allocated for use by a target cell, based upon a preset criterion, according to carrier use conditions of the adjacent cell base stations which are recorded in the carrier state indication set, and the adjacent cell base stations are coordinated to transmit no data over the carrier or some sources of the carrier (similar to the aforementioned carrier allocation processing or resource reservation processing). Then, a carrier state indication set corresponding to the cell base station is generated and is sent to the carrier coordination device 100, so as to complete initialization of the cell base station.

In another application example, when a cell base station needs to add an operating carrier, a method similar to that in the application example 1 may be adopted to complete measurement on all optional operating carriers and to look for adjacent cell base stations adjacent to the cell base station, and processing similar to that in both cases where adjacent cell base stations are found and where no adjacent cell base stations are found as described in the application example 1 may be adopted to determine the newly added operating carrier, which will not be redundantly described herein.

It should be noted that, the constituent units in the communication device in the wireless communication system according to the second embodiment of the invention may perform processing similar to that of the corresponding parts of the aforementioned carrier coordination device according to the first embodiment of the invention, and can realize similar functions and effects, which will not be redundantly described herein.

In addition, a third embodiment of the invention further provides a measurement device in a wireless communication system, the measurement device including: a measurement unit configured to receive measurement configuration information from a corresponding base station, to measure respective corresponding carriers according to the measurement configuration information and to send a result of the measurement to the base station as carrier state information.

In one implementation, the measurement unit may further receive a carrier resource configuration command from the base station and perform processing corresponding to the carrier resource configuration command, wherein the carrier resource configuration command for example may include a carrier switching command and/or a command to reserve at least a part of resources of a specified carrier.

In addition, in one implementation, during measurement of the respective corresponding carriers by the measurement unit, the measurement index may include CSI-RSRP, RSRP and/or CQI after Rel-10 and may include RSRP and/or CQI before Rel-10.

It should be noted that, the constituent units in the measurement device in the wireless communication system according to the third embodiment of the invention may perform processing similar to that of the corresponding parts of the aforementioned carrier coordination device according to the first embodiment of the invention and the communication device in the wireless communication system according to the second embodiment of the invention, and can realize similar functions and effects, which will not be redundantly described herein.

In addition, a fourth embodiment of the invention further provides a communication device in a wireless communication system, the communication device including: a communication unit configured to receive interference information describing interference suffered by a user equipment in a coverage thereof, to send the interference information to the carrier coordination device as described above, to receive a carrier resource configuration instruction from the carrier coordination device or carrier state information of an interference source base station, and to perform corresponding processing on the user equipment subjected to the interference according to the carrier resource configuration instruction or the carrier state information of the interference source base station.

In addition, a fifth embodiment of the invention further provides a communication device in a wireless communication system, the communication device including: a communication unit configured to send interference information describing interference suffered by the communication device to a service cell base station thereof, to receive a carrier switching command from the service cell base station, and to perform carrier switching according to the carrier switching command so as to select an appropriate carrier as a component carrier of the communication device to reduce the interference.

It should be noted that, the constituent units in the communication devices in the wireless communication systems according to the fourth and the fifth embodiments of the invention may perform processing similar to that of the corresponding parts of the aforementioned carrier coordination device, communication device and measurement device according to the first to the third embodiments of the invention, and can realize similar functions and effects, which will not be redundantly described herein.

In addition, a sixth embodiment of the invention further provides a carrier coordination method in a wireless communication system, the method including: receiving interference information describing interference suffered by a user equipment; and determining an interference source base station of the user equipment according to the interference information and coordinating carrier use of the user equipment and/or the interference source base station based upon at least the interference information and carrier state information of the interference source base station to reduce the interference suffered by the user equipment.

Below, exemplary processing of the carrier coordination method will be described in combination with FIG. 4.

Figure 4:
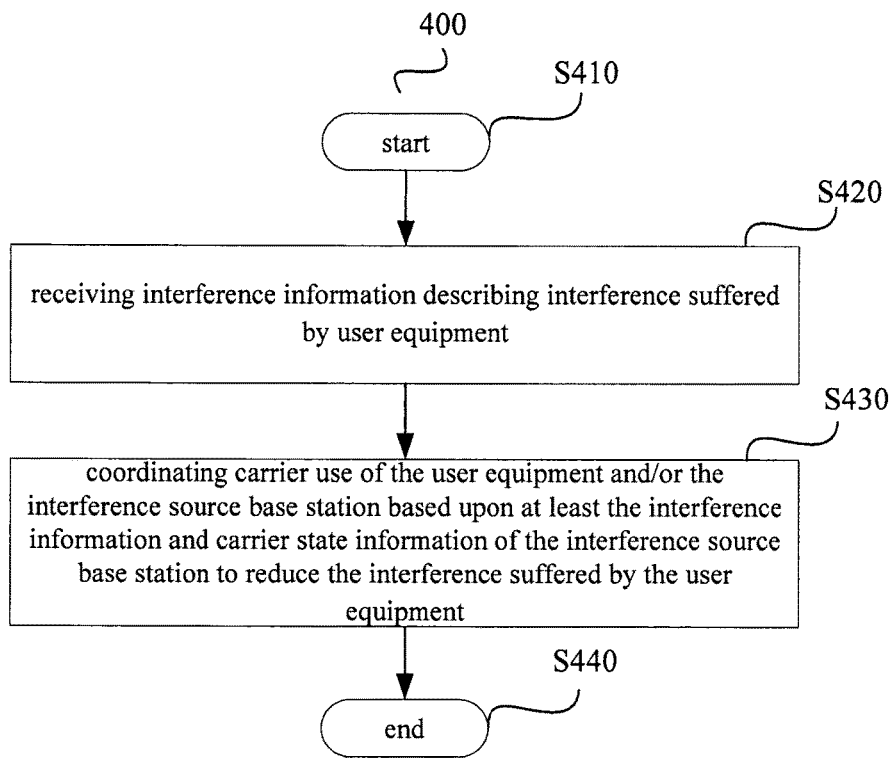
FIG. 4 is a flowchart schematically illustrating exemplary processing of a carrier coordination method in a wireless communication system according to a sixth embodiment of the invention.

As shown in FIG. 4, the processing flow 400 of the carrier coordination method according to the sixth embodiment of the invention starts at step S410, and then proceeds to step S420.

In the step S420, interference information describing interference suffered by a user equipment is received. Then the method proceeds to step S430. The processing performed in the step S420 for example may be the same as the foregoing processing of the reception unit 110 as described above in combination with FIG. 1A, and can produce similar technical effect, which will not be redundantly described herein.

In the step S430, an interference source base station of the user equipment is determined according to the interference information, and carrier use of the user equipment and/or the interference source base station is coordinated based upon at least the interference information and carrier state information of the interference source base station to reduce the interference suffered by the user equipment. Then the method proceeds to step S440. The processing performed in the step S430 for example may be the same as the foregoing processing of the coordination unit 120 as described above in combination with FIG. 1A, and can produce similar technical effect, which will not be redundantly described herein.

The processing flow 400 ends at the step S440.

As could be seen from the foregoing descriptions, the carrier coordination method according to the sixth embodiment of the invention coordinates carrier use of the user equipment and/or the interference source base station based upon at least the interference information and carrier state information of the interference source base station, making it possible to reduce the interference suffered by the user equipment. In addition, in some implementations, the carrier coordination method can coordinate carrier selection between small cell base stations and the user equipment using the carrier state indication set, such that the overall performance of the system can be improved while ensuring edge performances, thereby making it possible to further realize the balance between edge throughput and total throughput, so as to realize optimized configuration of the system.

In addition, a seventh embodiment of the invention further provides a communication method in a wireless communication system of configuring carrier resources in a corresponding communication range, the communication method including: obtaining carrier state information in the corresponding communication range, and sending the obtained carrier state information to the carrier coordination device as described above.

In addition, an eighth embodiment of the invention further provides a measurement method in a wireless communication system, the measurement method including: receiving measurement configuration information from a corresponding base station, measuring respective corresponding carriers according to the measurement configuration information, and sending a result of the measurement to the base station as carrier state information.

In addition, a ninth embodiment of the invention further provides a communication method in a wireless communication system, the communication method including: receiving interference information describing interference suffered by a user equipment in a corresponding coverage, sending the interference information to the carrier coordination device as described above, receiving a carrier resource configuration instruction from the carrier coordination device or carrier state information of an interference source base station, and performing corresponding processing on the user equipment subjected to the interference according to the carrier resource configuration instruction or the carrier state information of the interference source base station.

In addition, a tenth embodiment of the invention further provides a communication method in a wireless communication system, the communication method including: sending interference information describing interference suffered by a user equipment to a service cell base station of the user equipment, receiving a carrier switching command from the service cell base station of the user equipment, and performing carrier switching according to the carrier switching command so as to select an appropriate carrier as a component carrier of the user equipment to reduce the interference.

It should be noted that, the steps or sub-steps in various methods in the wireless communication systems according to the sixth to the tenth embodiments of the invention may respectively perform processing similar to that of the corresponding constituent units of the respective devices according to the first to the fifth embodiments of the invention, and can realize similar functions and effects, which will not be redundantly described herein.

In the foregoing descriptions in regard to the respective embodiments of the invention, features described and/or shown for one embodiment (implementation, example and the like) may be used in one or more other embodiments in an identical or similar way, or be combined with features in other embodiments, or replace features in other embodiments.

In addition, the methods according to the respective embodiments of the invention are not limited to be performed in the temporal order as described in the specification or as shown in the accompanying drawings, but may also be performed in other temporal orders, in parallel, or independently. Thus, the orders of performing the methods as described in the specification construct no limitations on the technical scope of the invention.

Finally, it should also be noted that in this text, relation terms such as left and right, first and second and the like are used only to distinguish one entity or operation from another entity or operation, but do not necessarily require or suggest the presence of any such an actual relation or order among these entities or operations. Furthermore the terms "include", "comprise" or any other variants thereof are intended to encompass nonexclusive inclusion so that a process, method, article or apparatus including a series of elements includes both those elements and one or more other elements which are listed explicitly or an element(s) inherent to the process, method, article or apparatus. Without much more limitation, an element being defined by a sentence "include/comprise a(n) . . . " will not exclude presence of an additional identical element(s) in the process, method, article or apparatus including the element.

The invention claimed is:

1. A carrier coordination device in a wireless communication system, comprising:
   a receiver configured to receive interference information describing interference suffered by a user equipment; and
   a circuitry configured to determine an interference source base station of the user equipment according to the interference information and to coordinate carrier use of the user equipment and/or the interference source base station based upon at least the interference information and carrier state information of the interference source base station to reduce the interference suffered by the user equipment wherein the circuitry is further configured to coordinate carrier use of the user equipment and/or the interference source base station based upon carrier state information of a plurality of base stations comprising the interference source base station and a service base station of the user equipment, and the circuitry is configured to estimate the interference suffered by the user equipment when the user equipment uses respective carriers of the service base station of the user equipment according to the carrier state information of the service base station of the user equipment and carrier state information of other related base stations, and selects a carrier with an interference less than or equal to a predetermined threshold for use by the user equipment.

2. The carrier coordination device according to claim 1, wherein the carrier state information comprises:
   state parameters of available carriers of a base station corresponding to the carrier state information; and
   carrier information representing carriers having been used by the base station corresponding to the carrier state information.

3. The carrier coordination device according to claim 2, wherein the carrier state information is represented by a carrier state indication vector comprising the state parameters and the carrier information.

4. The carrier coordination device according to claim 3, wherein the carrier state indication vector reflects a priority order of the available carriers and the priority order is set according to the state parameters of the available carriers.

5. The carrier coordination device according to claim 2, wherein the state parameters comprise channel states.

6. The carrier coordination device according to claim 1, wherein the circuitry is configured to determine the carrier state information of the plurality of base stations according to a predetermined carrier state indication set comprising identification information of the plurality of base stations and carrier state information corresponding to each of the plurality of base stations.

7. The carrier coordination device according to claim 6, wherein the receiver is configured to receive carrier selection/coordination request information of the user equipment, the carrier selection/coordination request information comprises the interference information, and the circuitry coordinates carrier use between respective base stations related to the carrier selection/coordination request information according to the carrier state indication set after the receiver receives the carrier selection/coordination request information.

8. The carrier coordination device according to claim 1, wherein the interference information comprises:
   identification information of the interference source base station; and
   carrier information representing carriers which are used by the interference source base station and with interference to the user equipment.

9. The carrier coordination device according to claim 1, wherein:
   the circuitry instructs, based upon the interference information and the carrier state information of the interference source base station, the interference source base station to reserve at least a part of resources with interference to the user equipment in used carriers thereof so that no data is transmitted over the reserved at least part of the resources.

10. The carrier coordination device according to claim 1, wherein:
   the circuitry instructs, based upon the interference information and the carrier state information of the interference source base station, the service base station of the user equipment and other base stations in the same cluster as the interference source base station and the service base station, the interference source base station to switch from a used carrier thereof with interference to the user equipment to another available carrier.

11. A communication device in a wireless communication system, comprising a communication unit configured to configure carrier resources in a corresponding communication range, wherein the communication unit is further configured to obtain carrier state information in the corresponding communication range and to send the obtained carrier state information to the carrier coordination device according to claim 1
   wherein the carrier coordination device coordinates carrier use of a wireless communication terminal and/or an interference source base station based upon carrier state information of a plurality of base stations comprising the interference source base station and a service base station of the wireless communication terminal, and estimates the interference suffered by the wireless communication terminal when user equipment uses respective carriers of the service base station of the user equipment according to the carrier state information of the service base station of the user equipment and carrier state information of other related base stations, and selects a carrier with an interference less than or equal to a predetermined threshold for use by the user equipment.

12. The communication device according to claim 11, wherein the communication unit is configured to receive from a measurement device the carrier state information measured by the measurement device and to configure the measurement device.

13. The communication device according to claim 11, wherein the communication unit is configured to construct the carrier state information as a carrier state indication vector and to send the carrier state indication vector to the carrier coordination device; and
   wherein the carrier state indication vector comprises state parameters of available carriers corresponding to the communication device and carrier information representing carriers having been used by the communication device.

14. The communication device according to claim 13, wherein the carrier state indication vector reflects a priority order of the available carriers of the communication device, and the priority order of the available carriers is set according to the state parameters of the available carriers.

15. The communication device according to claim 11, wherein the communication unit is further configured to receive a carrier resource configuration instruction from the carrier coordination device, to configure carrier resources used by a user equipment in the corresponding communication range according to the carrier resource configuration instruction and to send a result of the configuration to the carrier coordination device.

16. The communication device according to claim 11, wherein the communication unit is further configured to receive a carrier use indication from the carrier coordination device to determine a carrier to be used by the communication device according to the carrier use indication, wherein the carrier use indication is determined according to carrier state information of base stations related to the communication device.

17. The communication device according to claim 11, wherein the communication unit is further configured to receive carrier state information of base stations related to the communication device from the carrier coordination device, and to estimate interference conditions with respect to adjacent base stations respectively when the communication device configured respective carriers according to the received carrier state information of the base stations related to the communication device to determine a carrier to be used by the communication device.

18. A communication device in a wireless communication system, comprising:
a communication unit configured to receive interference information describing interference suffered by a user equipment in a coverage thereof, to send the interference information to the carrier coordination device of claim 1, to receive a carrier resource configuration instruction from the carrier coordination device or carrier state information of an interference source base station, and to perform corresponding processing on the user equipment subjected to the interference according to the carrier resource configuration instruction or the carrier state information of the interference source base station which sets a selected carrier to be used in communications with the wireless communications terminal so as to experience less carrier interference than a predetermined threshold.

19. The communication device according to claim 11, wherein the communication unit is configured to construct the carrier state information as a carrier state indication vector and to send the carrier state indication vector to the carrier coordination device; and
wherein the carrier state indication vector comprises state parameters of available carriers corresponding to the communication device and carrier information representing carriers having been used by the communication device.

* * * * *